W. T. SHEPARD.
WHEAT FOOD AND PROCESS OF PREPARING THE SAME.
APPLICATION FILED JUNE 16, 1911.
1,013,453.
Patented Jan. 2, 1912.
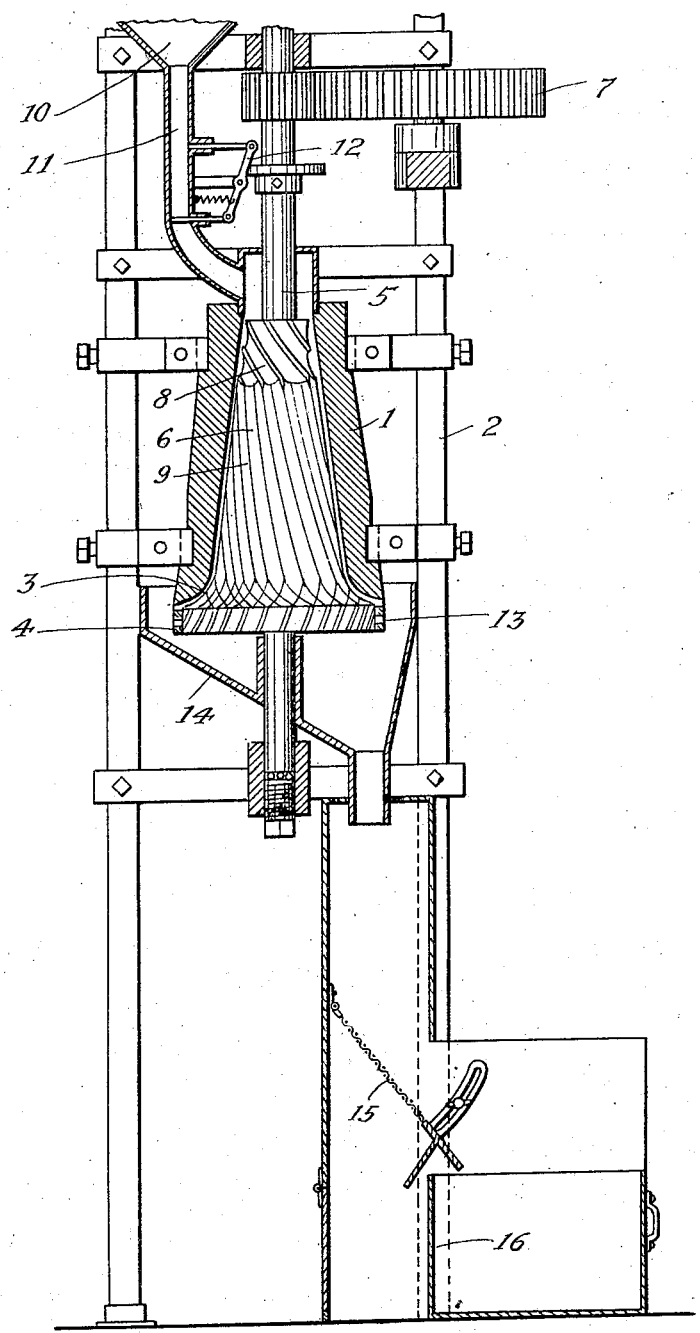

UNITED STATES PATENT OFFICE.

WILLIAM T. SHEPARD, OF LE MARS, IOWA.

WHEAT FOOD AND PROCESS OF PREPARING THE SAME.

1,013,453. Specification of Letters Patent. Patented Jan. 2, 1912.

Application filed June 16, 1911. Serial No. 633,629.

*To all whom it may concern:*

Be it known that I, WILLIAM T. SHEPARD, a citizen of the United States, residing at Le Mars, in the county of Plymouth and State of Iowa, have invented certain new and useful Improvements in Wheat Food and Processes of Preparing the Same, of which the following is a specification.

My invention relates to a food prepared from wheat berries in an uncooked condition, the food being a meal having distinctive characteristics such that when the same is properly prepared for eating, by the usual cooking operations, it will not only provide an extremely palatable and nourishing food, but also will have a dietary effect of great value as an aid to digestion and in the prevention and cure of constipation and kindred alimentary troubles.

The food having the above characteristics is the product of the specific method herein described, which method consists in first treating the wheat so as to materially increase its natural hardness and then milling the same so as to cut, break and tear the wheat berries into irregular pieces retaining the shell or bran thereupon without pulverizing or grinding. In this milling action the wheat berries are first cut or torn in a manner very similar to that of the teeth in chewing, with the result that the outer shell or bran is not removed from the fragments of starchy and glutinous matter but continue to adhere to such fragments. When, therefore, the food is cooked the fragments of bran will be surrounded by said starchy and glutinous material which in swelling will tend to curl back over the adhering fragments of bran. This results in a food which is palatable and can be eaten with relish, and yet which contains the coarse elements which are essential to produce the desired remedial and stimulative effects upon the elimination in the lower bowel, the bran having been freed from adhering particles during the earlier processes of digestion.

I have found it to be desirable to use white wheat, which is normally soft, instead of the hard red wheat, both because of the unsightly character of the product where the bran of red wheat is included, and because the white wheat responds more readily to the steps of my method and after being treated the hull or bran thereof will cling to the starchy and glutinous particles more tenaciously than is the case with the naturally hard red wheat. It is, however, absolutely essential in the production of my white wheat meal that the wheat at the time of milling shall be very hard, preferably harder than the hardest natural hard wheat, because soft wheat in its natural condition cannot be cut and torn into a granular meal having the characteristics which I desire but pulverizes under pressure and tends to slip the hull or bran. The first step in my process, therefore, consists in artificially hardening the wheat to the extent required.

After the wheat has been dry-cleaned in the ordinary way it is soaked and washed in water varying in temperature from practically cold water for wheat that is naturally quite hard to very hot water with the softest grades of wheat. This soaking will continue long enough to permit the water to penetrate the berry so as to cause more or less swelling of the grain. The exact length of time during which it will be necessary to continue the soaking operation will depend upon the character of the grain and will be determined by the extent of swelling, which should be such as approximately to increase the volume of grain from one-sixteenth to three-eighths. After the soaking operation has been performed the wheat is dried by the application of dry heat, the more rapid the drying without burning or cooking the wheat the greater will be the hardening effect. This rapid drying also causes the hull to adhere with much more than natural tenacity to the solid parts of the wheat berries. This drying action is obtained by placing the soaked wheat in a rotary wire screen and passing a current of hot dry air through the same while the screen is being rotated. The hot air may be obtained by forcing the same through a battery of heated radiators, or over hot plates or in any other desired manner. The temperature of the hot air will need to be greater as the degree of hardening to be obtained in the wheat berries is greater. That is, it is desirable, to produce the results sought, that the drying of the soaked wheat should be extremely rapid. As a result of this process white wheat, which, as is well known, is naturally very soft, becomes as hard as the best grades of naturally hard wheat, while the hull is caused to adhere to the solid portion of the berry so tenaciously that the peculiar type of cutting and chewing action to which I subject the grain in the final steps in the preparation of my wheat meal will not cause the hulls to slip from the solid parts, so that the food or meal obtained as the result of my complete process has the particles of bran still adhering to the starchy and glutinous portions of the meal.

The final steps in the preparation of my wheat meal consist in subjecting the grain, first, to a series of shearing cutting actions which act to progressively reduce the grain to more or less cleanly cut fragments having the particles of the hull or the bran adhering to the starchy and glutinous fragments; second, to subject the fragments so formed to an action which may be likened to that of the molar teeth by which these fragments of the grain are additionally rubbed and torn so as to render them irregular in form and cause the adhering bran to project slightly beyond the margins of the glutinous and starchy material composing the body of the grain fragments. This rubbing and tearing action will also have the effect of producing a certain amount of roughly pulverized flour. It is not desirable to have any really fine flour present in my meal. At the same time, if the meal were entirely composed of the irregular bran-holding fragments there would be a tendency in cooking for the food to be too loose and the edges of the bran to be too much in evidence to render the same as palatable as desired. The formation of the roughly pulverized flour, which in cooking with the granular fragments gives the food the proper consistency, is therefore an important feature of my process and the food product resulting therefrom. The fine flour and dust from the ciliary hairs of the wheat berries is removed by passing the meal over a screen of the proper mesh, and the final product consists largely of the aforesaid irregular bran-holding fragments with a small amount of roughly pulverized flour for the purpose stated.

Different forms of machinery or assemblages of machinery may be used in the production of my novel wheat meal. I have found the mechanism illustrated in the appended figure to give excellent results in the production of a meal from artificially hardened white wheat having the characteristics above noted.

The figure is a sectional elevation illustrating a form of machine adapted to perform the final steps in my process.

This machine comprises a hollow shell 1 mounted vertically in a framing 2, the interior of the shell being conical for the greater part of its length but flaring outwardly at 3 and having a depending cylindrical portion 4. Vertically mounted upon a shaft 5 is a milling roller 6 of the same exterior configuration as the cavity within the shell 1. The roller 6 is rotated by means of gearing 7 and is provided with a series of sets of slanting grooves 8 and 9, the interior of the shell 1 being also provided with a set of grooves similar to groove 9 but oppositely disposed with respect thereto. The set of grooves 8 are wide and sufficiently deep to form channels by means of which grain from the hopper 10, fed through the pipe 11, preferably intermittently by means of the double valve mechanism 12 upon the top of the roller 6, is forced downwardly to the grooves 9. Between the sets of grooves 8 and the sets of grooves 9 are toothlike corrugations sharply pointed forwardly in the direction of rotation of the roller 6. These toothlike members coöperate with similar members on the interior of the shell with a shearing action which results in cutting the wheat berries into fragments having the bran adhering thereto of the character above described. The flaring portion of the roller 6 has numerous grooves crossing the same in different directions, as shown, the portions intervening between said grooves being flat-topped and smooth, which arrangement provides, in coöperation with the grooves on the flaring portion 3 of the shell 1, the means for producing the rubbing and tearing action similar to the action of the molar teeth in chewing, above described. The cylindrical portion 4 of the shell is provided with apertures 13 through which the meal is forced, from which it falls upon the inclined bottom 14 of a receiving hopper. From the hopper the meal passes onto an inclined screen 15 where the desired amount of fine flour and dust is removed, the finished product being received in a receptacle 16.

The meal which results from the application of the different steps of my process is characterized by the fragments of the wheat berries having the bran adhering to the starchy and glutinous portions, said fragments being cut and torn into very irregular form and so that the edges of the particles of bran adhering thereto will project slightly beyond the margins of the body portions of the fragments, the meal comprising in addition a small amount of roughly pulverized flour, which, by reason of the irregular character of the aforesaid fragments, will be held in intimate contact therewith throughout all portions of the meal. This combination of irregular bran-holding fragments with the peculiar rough flour resulting from the final steps of my process gives the food when cooked, which may be effected by ordinary boiling, at the same time a granular character and a certain consistency which make it very palatable and agreeable to the taste. At the same time the bran and other rough parts of the grain is entirely retained in the food, although in such relation to the other parts thereof as to be not subject to detection when the food is being eaten.

I claim:

1. An article of food consisting of meal composed of granular fragments of wheat, said fragments being irregularly cut and torn and having portions of the wheat hulls or bran, including the inner membrane, adhering thereto, said portions of bran being larger in area than the glutinous and starchy parts of the fragments so that the edges of the bran portions extend beyond said starchy and glutinous parts.

2. An article of food consisting of meal composed of granular fragments of artificially hardened white wheat, said fragments being irregularly cut and torn and having portions of the wheat hulls or bran adhering thereto, said portions of bran being larger in area than the glutinous and starchy parts of the fragments so that the edges of the bran portions extend beyond said starchy and glutinous parts.

3. The method of preparing white wheat meal which consists in treating the wheat with water and dry heat to harden the same and cause the hull to adhere to the body of the grain, cutting the wheat berries into fragments in such manner that the hull or bran will continue to adhere to the body portions of said fragments, and tearing said fragments to render the same irregular and cause the bran portions to extend beyond the edges of the body portions.

4. The method of preparing white wheat meal which consists in treating the wheat with water and dry heat to harden the same and cause the hull to adhere to the body of the grain, cutting the wheat berries into fragments in such manner that the hull or bran will continue to adhere to the body portions of said fragments, tearing and rubbing said fragments to render the same irregular and at the same time form a small amount of roughly pulverized flour, and sifting out the finest flour and ciliary hair dust formed during the last step of the process.

5. The step in the process of preparing white wheat meal which consists in cutting the wheat into fragments having the hulls or bran adhering to the body portion of said fragments, and rubbing and tearing said fragments to render the same irregular and cause the particles of bran to extend beyond the margins of the body portions of the fragments.

6. The step in the process of preparing white wheat meal which consists in cutting the wheat berries into fragments having the hulls or bran adhering to the body portions of said fragments, rubbing and tearing said fragments to render the same irregular and produce a small amount of roughly pulverized flour, and separating the finest flour and ciliary hair dust from the product.

In testimony whereof I affix my signature in presence of two witnesses.

WILLIAM T. SHEPARD.

Witnesses:
L. C. GRONOW,
W. P. SHEPARD.

---

Copies of this patent may be obtained for five cents each, by addressing the "Commissioner of Patents, Washington, D. C."